(12) United States Patent
Barefoot et al.

(10) Patent No.: US 11,835,107 B2
(45) Date of Patent: Dec. 5, 2023

(54) COMBINED AIR SPRING AND DAMPER

(71) Applicant: Eko Sport, Inc., Grand Junction, CO (US)

(72) Inventors: Darek C. Barefoot, Grand Junction, CO (US); Eric Prinster, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 333 days.

(21) Appl. No.: 16/936,517

(22) Filed: Jul. 23, 2020

(65) Prior Publication Data

US 2021/0033164 A1 Feb. 4, 2021

Related U.S. Application Data

(60) Provisional application No. 62/880,994, filed on Jul. 31, 2019.

(51) Int. Cl.
| | |
|---|---|
| *F16F 9/02* | (2006.01) |
| *F16F 9/46* | (2006.01) |
| *B62K 25/28* | (2006.01) |
| *B62K 25/30* | (2006.01) |
| *B62K 25/04* | (2006.01) |

(52) U.S. Cl.
CPC ............ *F16F 9/461* (2013.01); *B62K 25/286* (2013.01); *B62K 25/30* (2013.01); *F16F 9/0245* (2013.01); *F16F 9/0281* (2013.01); *B62K 2025/044* (2013.01); *B62K 2025/045* (2013.01); *B62K 2025/048* (2013.01); *F16F 2230/0005* (2013.01); *F16F 2230/186* (2013.01); *F16F 2230/32* (2013.01)

(58) Field of Classification Search
CPC ............... F16F 9/461; F16F 2230/0005; F16F 2230/186; F16F 2230/32; B62K 2025/044; B62K 2025/045; B62K 2025/048
See application file for complete search history.

(56) References Cited

U.S. PATENT DOCUMENTS

| | | | |
|---|---|---|---|
| 5,775,677 A | 7/1998 | Englund | |
| 6,260,832 B1 * | 7/2001 | Vignocchi | F16F 9/44 188/322.22 |
| 6,543,754 B2 | 4/2003 | Ogura | |
| 7,163,222 B2 * | 1/2007 | Becker | B60G 17/08 280/276 |
| 8,496,096 B2 * | 7/2013 | Mochizuki | F16F 9/432 188/322.19 |
| 8,511,448 B2 * | 8/2013 | Gonzalez | B62K 25/08 280/276 |
| 9,688,347 B2 * | 6/2017 | Yablon | F16F 9/48 |
| 9,731,574 B2 * | 8/2017 | Barefoot | B60G 15/12 |
| 9,981,712 B2 * | 5/2018 | Barefoot | B62K 25/04 |
| 10,145,436 B2 * | 12/2018 | Barefoot | F16F 9/0281 |

(Continued)

*Primary Examiner* — Xuan Lan Nguyen
(74) *Attorney, Agent, or Firm* — Jason H. Foster; Kremblas & Foster

(57) ABSTRACT

A suspension system includes a first compression chamber and a second compression chamber with a damping chamber therebetween. The compression chambers may be independently filled with a compressible fluid, and the relative pressures may govern the rebound rate of the suspension. Seals that minimize friction, an adjustment system, and a stop are also included to enhance rider joy.

12 Claims, 8 Drawing Sheets

(56) References Cited

U.S. PATENT DOCUMENTS

| | | | |
|---|---|---|---|
| 10,358,180 B2 * | 7/2019 | Shipman | B62J 1/08 |
| 10,578,179 B2 | 3/2020 | Laird | |
| 10,731,724 B2 * | 8/2020 | Laird | F16F 9/34 |
| 2018/0281893 A1 * | 10/2018 | Awano | B62K 25/08 |
| 2019/0145483 A1 * | 5/2019 | Laird | F16F 13/007 |
| | | | 188/322.15 |
| 2020/0191227 A1 | 6/2020 | Laird | |

* cited by examiner

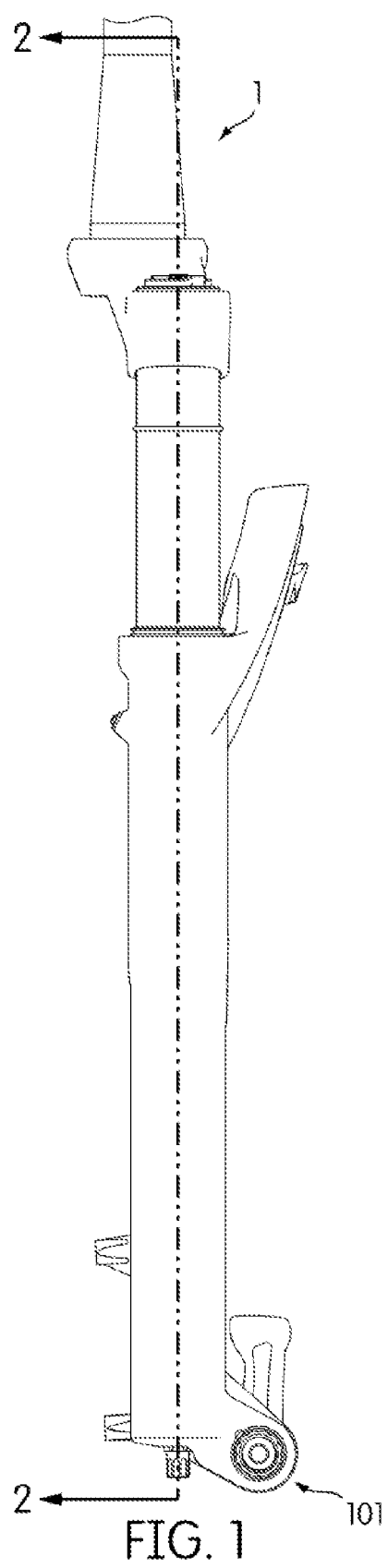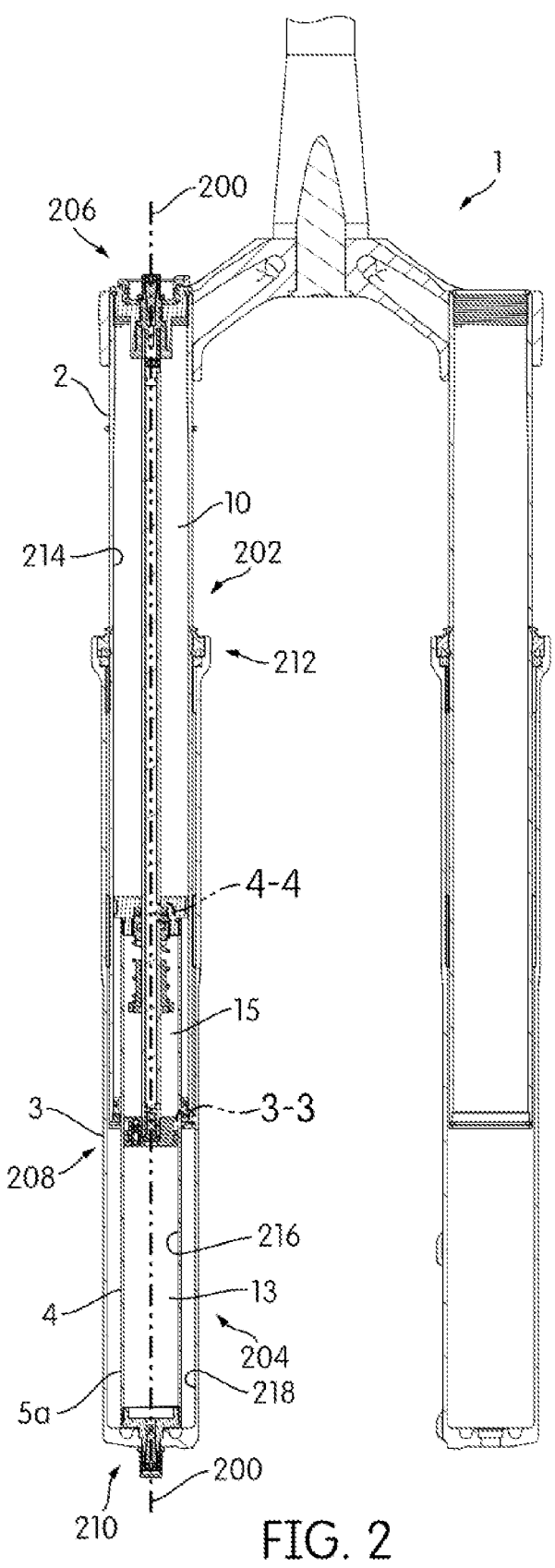
FIG. 1
FIG. 2

COMBINED AIR SPRING AND DAMPER

BACKGROUND OF THE INVENTION

The present disclosure relates to a suspension system for a bicycle. More specifically, the present design relates to a suspension system for a bicycle, where a compressible fluid is used as a spring and as a damping fluid. Further, the present design relates to a configuration of dynamic seals that reduce friction during a compression stroke.

Bicycle suspension requires low weight, low friction, adjustable spring support, a convenient adjustment for rebound damping, and an on-the-fly adjustment to raise compression damping and/or spring rate to a high value for climbing and sprinting. The air sprung suspensions of prior art are prone to stick-slip friction. Air damped suspensions generally have lacked an on-the-fly compression damping adjustment.

Accordingly, in many embodiments, it may be desirable to incorporate a first compression chamber and a second compression chamber with a damping chamber therebetween. It may also be desirable to configure valving to allow a user to adjust the pressures in each of the chambers to create a desirable spring and damping rate. Further, it may be desirable to configure seals that minimize friction during a compression stroke.

BRIEF SUMMARY OF THE INVENTION

The present disclosure is directed to a shock absorber for a bicycle having various desirable features.

In one embodiment, the shock absorber may include a first tube, a second tube and a third tube. The first tube may at least partially define a first compression chamber. The third tube may be within the second tube and may at least partially define a second compression chamber and a damping chamber. The damping chamber may be axially between the first compression chamber and the second compression chamber.

The shock absorber may also include a first valve that permits the adjustment of fluid pressure within the first compression chamber. The shock absorber may also include a second valve that allows the adjustment of fluid pressure within the second compression chamber. The fluid pressure in the first compression chamber and the fluid pressure in the second compression chamber may be independently adjustable. The shock absorber may also include an adjustable valve positioned in a fluid path between the second compression chamber and the damping chamber. The shock absorber may also include an adjuster positioned adjacent the first tube for adjusting the adjustable valve. The difference between the fluid pressure in the first compression chamber and the fluid pressure in the second compression chamber may govern a rate of rebound for the shock absorber.

In another embodiment, the shock absorber may include a first end, a second end, a first piston, a second piston, a first biased valve, and a second biased valve. The first end may at least partially define a first compression chamber filled with a compressible fluid. The second end may at least partially define a second compression chamber and a first damping chamber. Each of the second compression chamber and the first damping chamber may be filled with a compressible fluid. The first piston may be attached in substantially fixed relationship to the second end. The first piston may be configured to reciprocate within the first end. The second piston may be attached in substantially fixed relationship to the first end. The second piston may be configured to reciprocate within the second end. Movement of the second piston may at least partially define the relative sizes of the second compression chamber and the first damping chamber. The first biased valve may be configured to permit fluid flow between the second compression chamber and the first damping chamber when the force of the fluid within the second compression chamber exceeds the force of the fluid within the first damping chamber and the force of the bias on the first biased valve. The second biased valve may be configured to permit fluid flow between the second compression chamber and the first damping chamber when the force of the fluid within the first damping chamber exceeds the force of the fluid within the second compression chamber and the force of the bias on the second biased valve.

The first biased valve may be adjustable. The shock absorber may further include an adjuster positioned adjacent the first tube for adjusting the adjustable valve. The difference between the air pressure in the first compression chamber and the air pressure in the second compression chamber may govern a rate of rebound of the shock absorber. Fluid pressure within the first compression chamber may be set independently of fluid pressure within the second compression chamber. The shock absorber may further include a stop capable of substantially preventing fluid from entering the second valve.

In another embodiment, the shock absorber may include a first tube, a first valve, a second tube, a second valve, a third valve, and an adjuster. The first tube may at least partially define a first compression chamber filled with a compressible fluid. The first valve may permit the compressible fluid to be removed from the first compression chamber and to permit additional compressible fluid to be added to the first compression chamber. The second tube may at least partially define a second compression chamber and a first damping chamber. The second compression chamber and the first damping chamber may each be filled with the compressible fluid. The second valve may permit the compressible fluid to be removed from the second compression chamber and to permit additional compressible fluid to be added to the second compression chamber. A third valve may be between the second compression chamber and a first damping chamber. The third valve may permit compressible fluid to flow between the second compression chamber and the first damping chamber. The adjuster may be capable of adjusting a threshold at which the third valve opens to allow compressible fluid to flow between the second compression chamber and the first damping chamber.

Fluid pressure within the first compression chamber may be set independently of fluid pressure within the second compression chamber. A difference between the fluid pressure in the first compression chamber and the fluid pressure in the second compression chamber may govern a rate of rebound of the shock absorber. The shock absorber may further include a fourth valve between the second compression chamber and the first damping chamber. The fourth valve may permit compressible fluid to flow between the second compression chamber and the first damping chamber.

A first dynamic seal may be attached to the first end and may be in sealing engagement with the second end. A second dynamic seal may be attached to the second end and may be in sealing engagement with the first end. The first dynamic seal and the second dynamic seal may be respectively oriented to minimize friction between the respective seal and the respective end with which it is in sealing engagement during a compression stroke. The first dynamic seal may be oriented in a first direction and the second dynamic seal may be oriented in a second direction opposite the first direction.

In another embodiment, a shock absorber may include a first tube, a second tube, a third tube, a first seal, a first shaft, a first piston, and a second seal. The first tube may include a first tube free end. The third tube may include a third tube free end. The first seal may be attached to the first tube free end and may be sealingly engaged with the third tube. The first shaft may be attached to the first tube. The first piston may be attached to the third tube free end. The first piston may substantially surround the first shaft and may have an inner diameter and an outer diameter. The second seal may be attached to the inner diameter of the first piston. The first seal and the second seal may have the same shape. The first seal may be oriented in a first direction and the second seal may be oriented in a second direction.

In another embodiment, a shock absorber may include a first end assembly and a second end assembly. The first end assembly may include a first dynamic seal. The first dynamic seal may have a portion in sealing engagement with the second end assembly. The second end assembly may include a second dynamic seal. The second dynamic seal may have a portion in sealing engagement with the first end assembly. The first dynamic seal and the second dynamic seal may each be oriented to minimize friction between the seal and the end with which it is in sealing engagement during a compression stroke.

In another embodiment, a shock absorber may include a first chamber, a first valve, a second chamber, a second valve, a third chamber, a third biased valve, a first barrier and a second barrier. The first valve may allow the introduction of a first compressible fluid to and removal of the first compressible fluid from the first chamber. The second valve may allow the introduction of a second compressible fluid to and removal of the second compressible fluid from the second chamber. The third biased valve may allow the introduction of the second compressible fluid to the third chamber from the second chamber. The adjuster may be configured to adjust the bias of the third biased valve. The first barrier may be between the first chamber and the third chamber. The first barrier may be capable of axial movement. The second barrier may be between the second chamber and the third chamber. The third biased valve may be positioned adjacent the second barrier. The pressure of the first compressible fluid, the pressure of the second compressible fluid, and the bias of the third biased valve may define the relative sizes of the first chamber, the second chamber and the third chamber.

In another embodiment, a shock absorber may include a first end, a second end, a first piston, a second piston, a first valve, a second valve, and a stop. The first end may at least partially define a first compression chamber filled with a compressible fluid. The second end may at least partially define a second compression chamber and a first damping chamber. Each of the second compression chamber and the first damping chamber may be filled with a compressible fluid. The first piston may be attached in a substantially fixed relationship to the second end. The first piston may be configured to reciprocate within the first end. The second piston may be attached in substantially fixed relationship to the first end. The second piston may be configured to reciprocate within the second end. Movement of the second piston may at least partially define the relative sizes of the second compression chamber and the first damping chamber. The first valve may be configured to permit fluid flow between the second compression chamber and the first damping chamber. The second valve may be configured to permit fluid flow between the second compression chamber and the first damping chamber. The stop may be configured to prevent fluid from entering the second valve.

BRIEF DESCRIPTION OF THE SEVERAL VIEWS OF THE DRAWINGS

FIG. 1 is a side view of a shock absorber according to the disclosure;

FIG. 2 is a simplified sectional view of the shock absorber according to FIG. 1;

Figure 3:
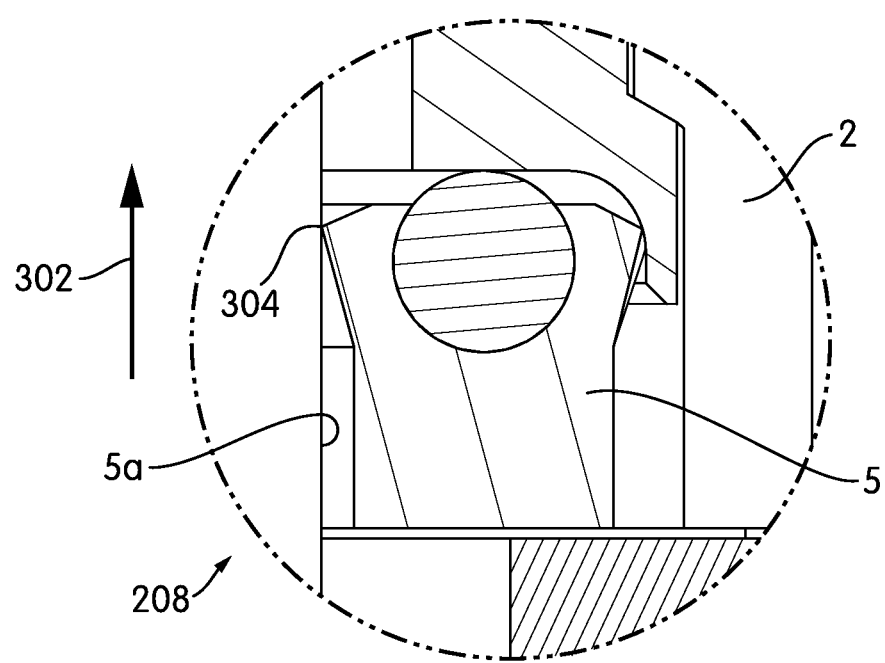
FIG. 3 is an enlarged view of the area enclosed by the circle identified as 3-3 in FIG. 2.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

U.S. Provisional Application No. 62/880,994 filed Jul. 31, 2019 is herein incorporated by reference.

The present device relates to a suspension system for a bicycle. The illustrations herein do not show the remainder of the bicycle structure. However, an ordinary designer will fully understand how the structures described herein may be incorporated into a bicycle.

In the description and claims, various parts may be referred to numerically, such as as by "first valve", "second valve", and the like. When the parts are numbered in such a manner, it will be understood by a person having ordinary skill in the art that any of the parts in that category could be understood to be the "first" or the "second" or any other number. When these descriptors are used, it is to assist the person of ordinary skill in the art to distinguish among like items.

The shock absorber device disclosed is shown in one leg of the bicycle fork 1. Alternatively, it can easily be adapted to serve as a shock absorber for the rear wheel of a bicycle. This alternative embodiment is not specifically illustrated herein. However, a person having ordinary skill in the art is able to make the appropriate, known, standard design changes to adapt the design to a rear shock without undue experimentation.

The bicycle fork is shown in FIG. 2 in section with the combined air spring and damper in the right leg 202 from the perspective of a rider on the bicycle. The right fork leg consists of the first tube 2 with a closed end 206 and an open end 208. The first tube 2, collectively with the parts attached to the first tube, may also be referred to as the first end or the first end assembly. The first tube 2 may be telescopically and slidably engaged with the second tube 3, which likewise has a closed end 210 and an open end 212. The first tube at its closed end may be joined to a crown and steerer adapted to be connected to the head tube of the bicycle (not shown). The first tube 2 may be configured to telescopically interfit with a second tube or end 3. The closed end 210 of the second tube 3 may be adapted to accept one of the ends of the axle 101 of the front wheel of the bicycle (see FIG. 1).

Figure 6:
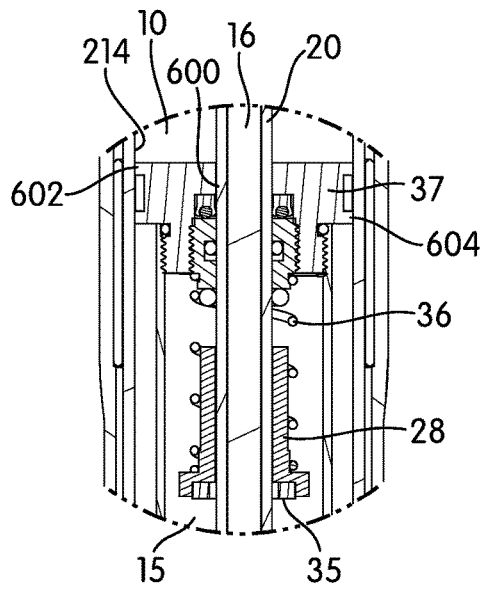
FIG. 6 is an enlarged view of the area enclosed by the circle identified as 6-6 in FIG. 5.
Figure 7:
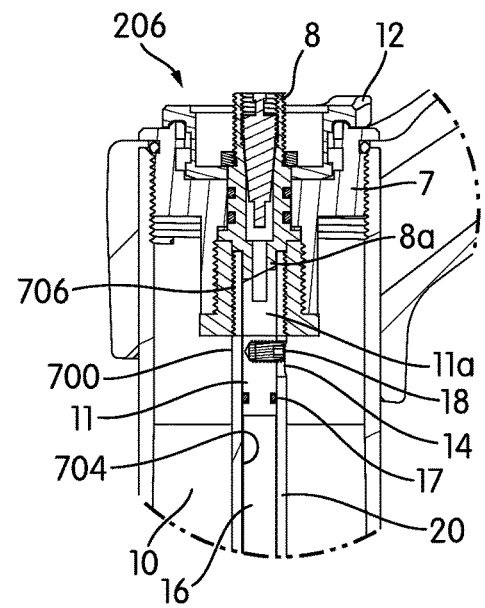
FIG. 7 is an enlarged view of the area enclosed by the circle identified as 7-7 in FIG. 5.

Referring to FIGS. 2 and 7, the upper annular portion of the first tube 2 may at least partially define a first compression chamber 10 which may be filled with a compressible fluid, such as a gas. A first Schrader valve 8 (best seen in FIG. 7) may be positioned on the first tube 2 to allow a user to put a desired amount of a compressible fluid into the first compression chamber 10. The first valve 8 is illustrated as allowing access to the first compression chamber 10 through the closed end 206 of the first tube 2. However, in other embodiments, the first valve 8 could be positioned elsewhere on the first tube 2, if desired by the designer. The inner surface 214 of the upper tube 2 may be slidably engaged with the outer diameter 602 of the first piston 37 (best seen in FIG. 6).

A third tube 4 may be positioned within the second tube 3. The second tube 3 and the third tube 4 may desirably be coaxial. In the embodiment illustrated in FIG. 2, the free end 208 of the first tube 2 may be interfitted between the inner surface 218 of the second tube 3 and the outer surface 5a of the third tube 4.

Figure 8:
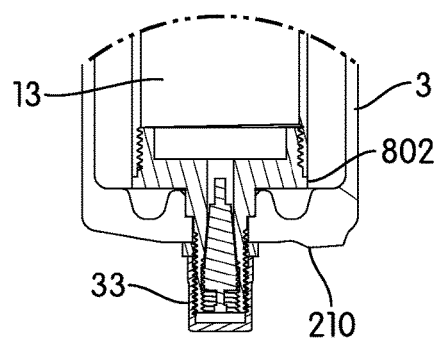
FIG. 8 is an enlarged view of the area enclosed by the circle identified as 8-8 in FIG. 5.

As may be best seen in FIG. 6, the first piston 37 may be fixed to a free end 604 of the third tube 4. The first piston 37 may be configured to reciprocate within the first end during a suspension stroke. Movement of the first piston 37 within the first end may compress a compressible fluid within the first compression chamber 10, as is conventional. As may be best seen in FIG. 8, the third tube 4 may be connected at its base 802 to the closed end 210 of the second tube 3. The third tube 4 may at least partially define a second compression chamber 13 and a damping chamber 15. The damping chamber 15 may be axially between the first compression chamber 10 and the second compression chamber 13. The combination of the second tube 3 and the third tube 4, along with the related parts, may collectively be referred to as the second end or the second end assembly.

In the illustrated embodiment, the compressible fluid in the first compression chamber 10 is separate from the compressible fluid in the second compression chamber 13. In such a configuration, the suspension system 1 may include two valves that can independently fill the chambers. In the illustrated embodiments, a first conventional Schrader valve 8 may be positioned on the first end to allow a user to fill the first compression chamber 10 with a compressible fluid, such as gas, to a desired level of pressure (shown most clearly in FIG. 7) or to adjust the level of pressure within the first compression chamber. As may be best seen in FIG. 8, a second conventional Schrader valve 33 may be positioned on the second end to allow a user to fill the second compression chamber 13 and the damping chamber 15 to a desired level of pressure or to adjust the level of pressure within the second compression chamber 13 and the damping chamber 15. In some embodiments, the second compression chamber 13 and the damping chamber 15 may be filled substantially simultaneously with a compressible fluid, such as gas, through the second Schrader valve 33. The second valve 33 is shown as penetrating the closed end 210 of the second tube 3, and the first valve 8 is shown as penetrating the closed end 206 of the first tube 2. However, in other embodiments, the first valve 8 and the second valve 33 may be positioned in another location on a respective tube, if desired by a designer. The use of two Schrader valves 8 and 33 may allow a user to independently adjust the pressure in the respective compression chambers.

As may be best seen in FIG. 3, the outer surface 5a of the third tube 4 may contact the first dynamic seal 5 fixed to the lower end 208 of the first tube 2, thereby creating a sealing engagement between the first dynamic seal 5 and the third tube 4. The lip 304 of the first dynamic seal 5 extends from the first tube 2 to the outer surface 5a of the third tube 4 and may be oriented angularly approximately in a first direction, which is the direction that the third tube 4 moves during compression of the suspension. This direction of movement by the third tube 4 is shown as the arrow 302. Because of its orientation, during compression the lip 304 of the seal 5 does not successively tuck, grab, and then slip against the third tube 4 as it could if it were oriented against the direction of compressive movement of the third tube 4.

The first dynamic seal 5 in the lower end 208 of the first tube 2 has no lip or lips oriented against the direction of compressive movement of the third tube 4, that is, in a second direction opposite the first direction 302, because during normal operation the pressure of the gas inside the first tube 2 is always greater than the pressure of gas contained immediately exterior to the first tube 2 and the third tube 4.

Figure 4:
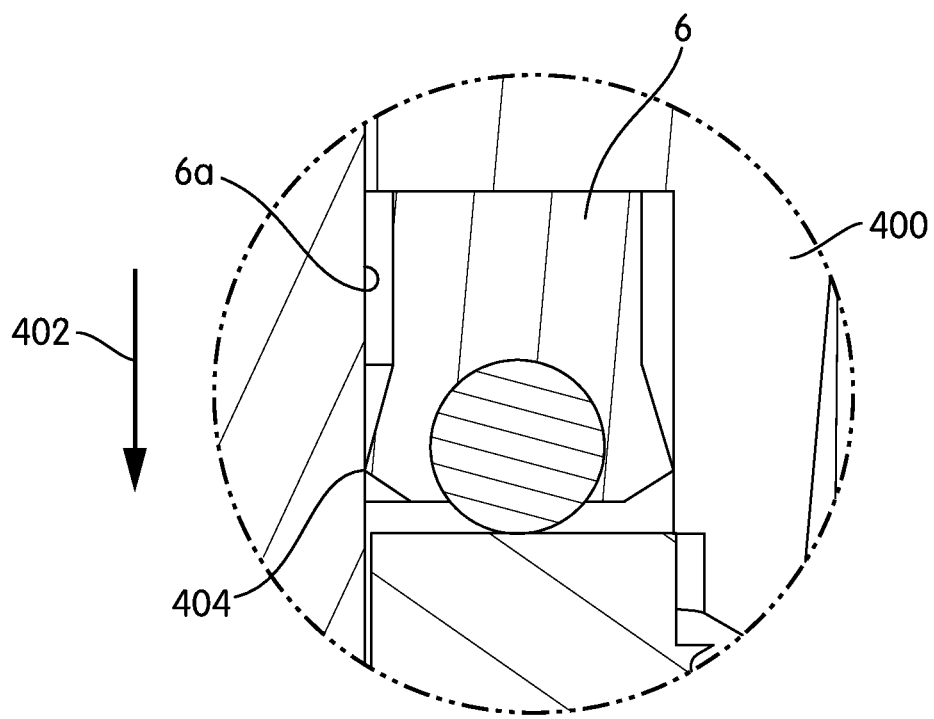
FIG. 4 is an enlarged view of the area enclosed by the circle identified as 4-4 in FIG. 2.
Figure 5:
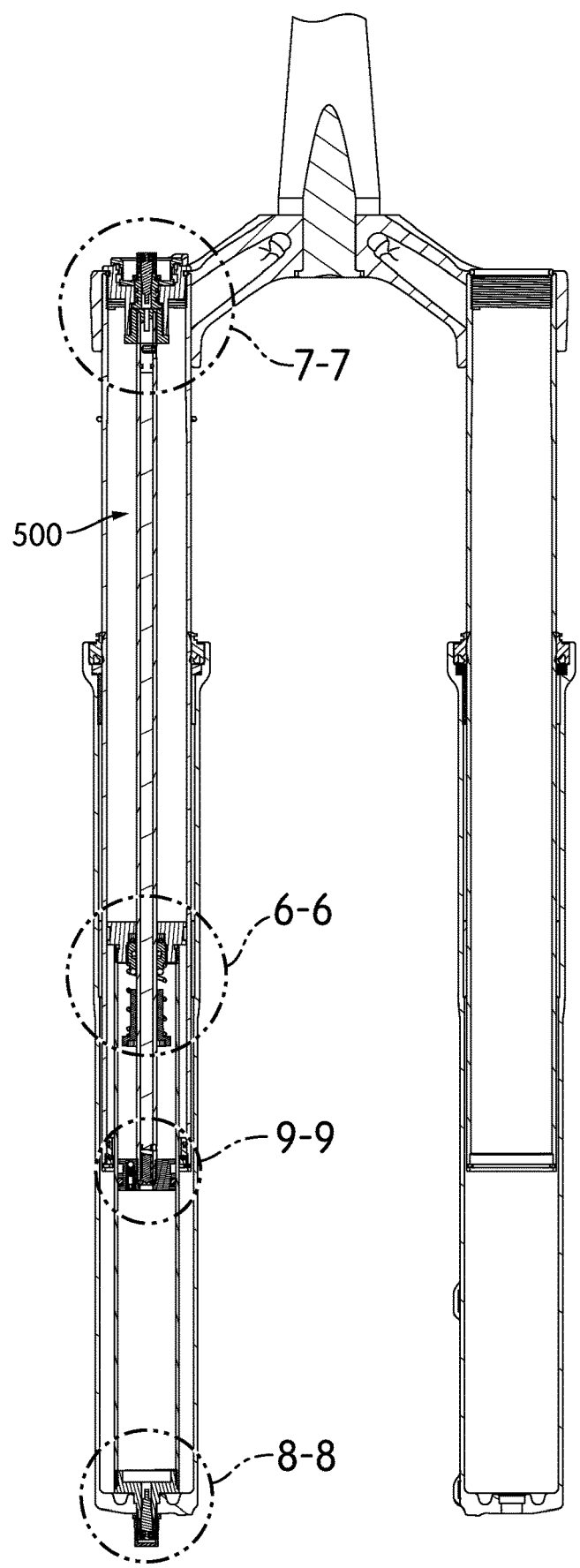
FIG. 5 is a duplicate view of FIG. 2.

As may be best seen in FIG. 4, the outer surface 6a of the damper shaft 20 may contact the second dynamic seal 6 in the center of the first piston 37 and thereby cause the sealing engagement of second dynamic seal 6 and the damper shaft 20. The second dynamic seal 6 on the first piston 37 may have a lip 404 that may extend from the first piston 37 to the surface 6a of the damper shaft 20 angularly approximately in a second direction, which is the direction that the damper shaft 20 moves during compression of the suspension. This direction of movement of the damper shaft is indicated with the arrow 402. The second direction 402 may be approximately opposite the first direction 302. Because of its orientation, during compression the lip 404 of the second dynamic seal 6 does not successively tuck, grab, and then slip against the damper shaft 20 as it could if it were oriented against the direction of compressive movement of the damper shaft 20. The second dynamic seal 6 in the first piston 37 may have no lip or lips oriented against the direction of compressive movement of the damper shaft 20 because during normal operation the pressure of the gas inside the third tube 4 is always greater than the pressure of gas contained immediately exterior to the third tube 4.

In the illustrated embodiments, and in many configurations, it may be desirable for the first dynamic seal 5 to have substantially the same shape and size as the second dynamic seal 6. In some embodiments, the first dynamic seal 5 is oriented in a first direction, and the second dynamic seal is oriented in a second direction opposite the first direction. This opposite orientation of the first dynamic seal 5 and the second dynamic seal 6 may minimize friction between the seal and the end with which it is in sealing engagement during a compression stroke.

Because the interior chambers 13 and 15 of the third tube 4 do not communicate with the first compression chamber 10, as the damper shaft 20 moves into the third tube 4 it displaces volume, thereby raising the pressure of the gas in the third tube 4. Because the inner cavities or chambers defined by the third tube 4 do not communicate with the first compression chamber 10, when the third tube 4 moves into the first tube 2, it displaces substantial volume, thereby raising the pressure of the gas in the first compression chamber 10.

Figure 9:
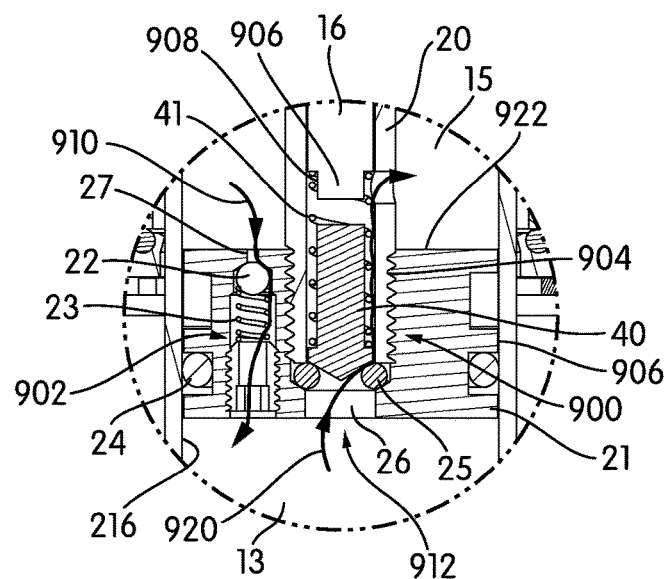
FIG. 9 is an enlarged view of the area enclosed by the circle identified as 9-9 in FIG. 5.
Figure 10:
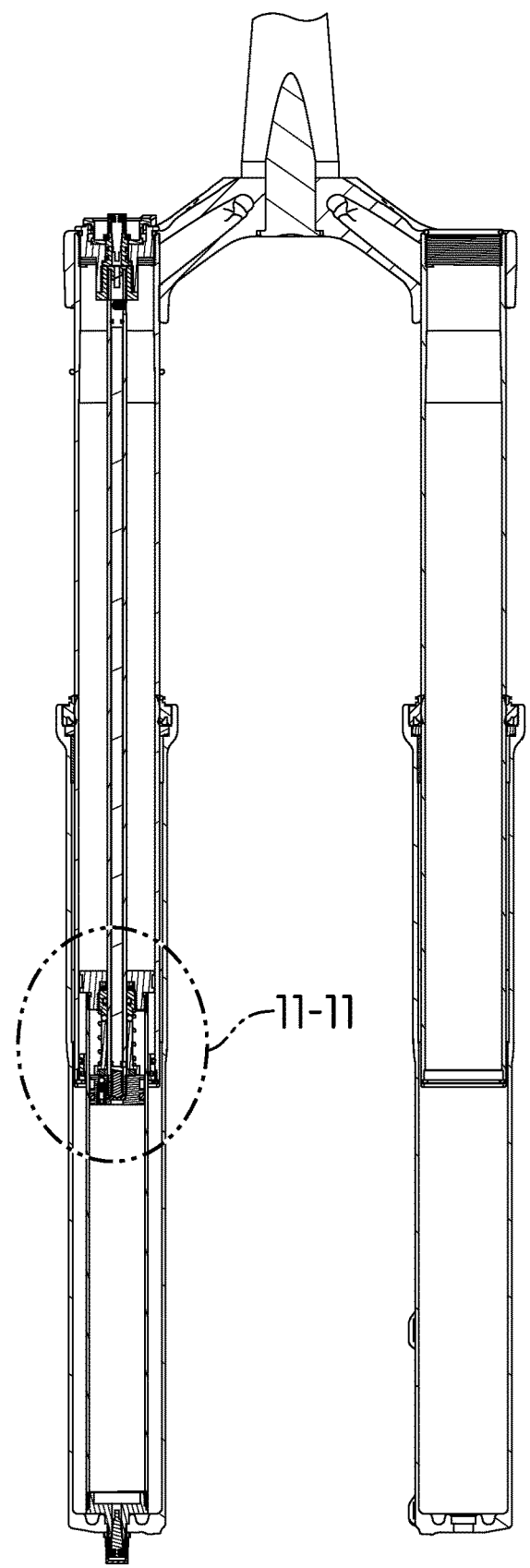
FIG. 10 is a simplified sectional view of the shock absorber according to FIG. 1, showing the shock absorber in a compressed position.

As may be best seen in FIG. 9, the second piston 21 may be fixed to a free end 904 of the damper shaft 20, which is connected at its other end to the cap 7 that that closes at least a portion of the closed end 206 of the first tube 2. The second piston 21 may slidably engage with the inner surface 216 of the third tube 4. The large o-ring 24 on the outside circumference 906 of the second piston 21 may separate the interior of the third tube 4 into a second compression chamber 13 and a rebound or damping chamber 15.

In many embodiments, it may be desirable to incorporate a first biased valve 900 on a fluid path 26 between the second compression chamber 13 and the damping chamber 15. The first biased valve 900 may be adjustable. As may be seen in FIGS. 6, 7 and 9, an adjuster rod 16 may be positioned within the damper shaft 20. A shuttle 11 may be positioned adjacent the upper end 700 of the adjuster rod 16. A seal 17 of the shuttle 11 may substantially prevent fluid communication between the first compression chamber 11 and the chambers 13 and 15 in the third tube 4 through the interior 704 of the damper shaft 20. The lower end 906 of the adjuster rod 16 may be attached or adjacent to one end 908 of the first check spring 41. The second end 910 of the check spring 41 may engage a valve peg 40.

The cap 7 that closes the closed end 206 of the first tube 2 may contain an adjuster, such as the knob 12, through which extends the first Schrader valve 8 that was described above. The adjuster 12 may be capable of adjusting the threshold at which the first biased valve 900 opens to allow fluid to flow between the first compression chamber 13 and the first damping chamber 15. The first Schrader valve 8 may be fixed rotationally to the adjuster 12 so that the user, by rotating the adjuster 12, may rotate the first Schrader valve 8. At the lower extremity of the first Schrader valve 8 is a diagonal surface 8a that may contact a complementary diagonal surface 11a at the top 706 of the shuttle 11.

The set screw 18 of the shuttle 11 may protrude into a vertically-oriented oval slot 14 in the top 700 of the damper shaft 20. Because the shuttle 11 is not free to rotate with the first Schrader valve 8 but is free to move axially, that is, vertically, the user may displace the shuttle 11 downward by rotating the adjuster 12 so that the diagonal surface 8a of the Schrader valve 8 and diagonal surface 11 a of the shuttle 11 are opposed rather than mated.

When the shuttle 11 is displaced by rotation of the adjuster 12 and Schrader valve 8, the adjuster rod 16 may also be forced axially downward until the adjuster rod 16 presses against the valve peg 40 in the second piston 21. The valve peg 40 thereby may be forced against the center o-ring 25 of the second piston 21 and may be prevented from moving upward in response to rising pressure in the second compression chamber 13. The first check spring 41 may sealing urge the valve peg 40 against a resilient seal, such as the illustrated o-ring 25 in the center 912 of the second piston 21. The entrapment of gas in the second compression chamber 13 may increase significantly the resistance of the suspension to compression.

Figure 14:
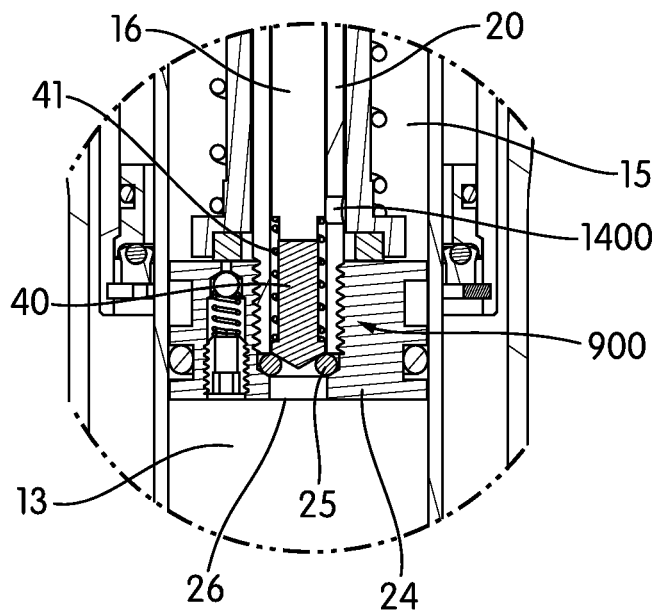
FIG. 14 is an enlarged view of the area enclosed by the circle identified as 14-14 in FIG. 12.
Figure 15:
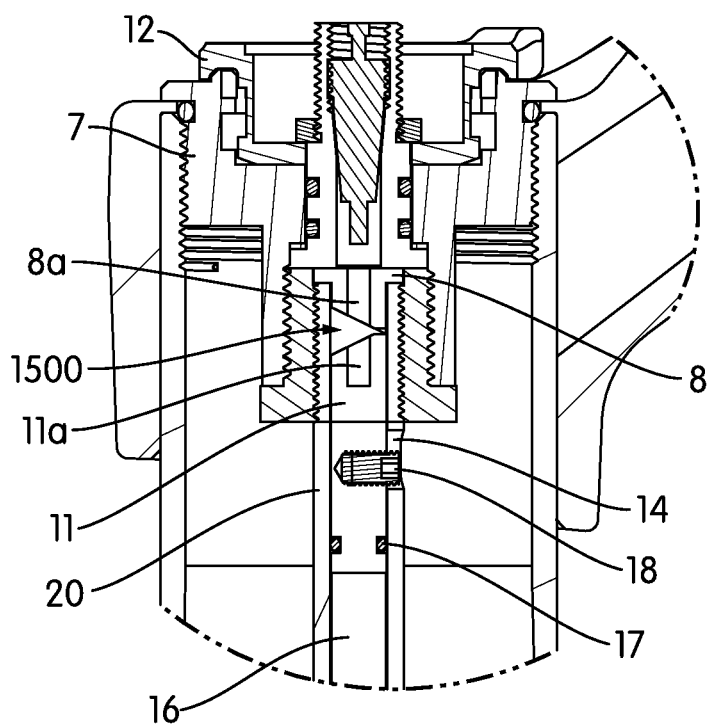
FIG. 15 is an enlarged view of the area enclosed by the circle identified as 15-15 in FIG. 12.

Turning to FIG. 15, the function of the adjuster 12, may become more clear. When the user rotates the adjuster knob 12, the angled or diagonal surface 8a may rotate and displace the shuttle 11, such that there is a gap 1500 created between at least some portions of the diagonal surface 8a and some portions of the diagonal surface 11a. This causes the vertical or axial movement of the shuttle 11 downwardly, thereby displacing the adjuster rod 16 within the shaft 20. The embodiment of FIG. 15 is at the most extreme adjustment, where the adjuster rod 16 is moved axially downwardly to force the first adjustable valve 900 into a substantially closed position, such as that seen in FIG. 14. As may be seen in FIG. 14, the adjuster rod 16 is positioned to occlude or substantially occlude the fluid flow path 26 by blocking or substantially blocking the aperture 1400 in the shaft 20, thereby substantially eliminating the damping function.

The user therefore by rotating the knob 12, which is within easy reach even while the bike is being ridden, may raise the compression damping and/or spring rate of the suspension. The increased resistance to compression reduces unwanted suspension movement during vigorous pedaling, as when the rider is climbing or sprinting.

The second piston 21 may be configured to reciprocate within the second end, and the movement of the second piston 21 may at least partially define the relative sizes of the second compression chamber 13 and the damping chamber 15. During a compression stroke of the suspension, the second piston 21 may move downward within the suspension 1. When the second piston 21 moves downward, it may reduce the effective size of the second compression chamber 13 within the third tube 4. The pressure of the gas in the second compression chamber 13 may rise until it exceeds or overcomes the force of the gas in the damping chamber 15 and the force of the first check spring 41, at which point the valve peg 40 may move upward, thereby permitting gas to flow between the second compression chamber 13 and the damping chamber 15, and more specifically from the second compression chamber 13 into the rebound chamber 15. The flow path is shown in FIG. 9 as the arrow 920.

The second piston 21 may further include a second biased valve 902 that may be configured to govern fluid flow between the damping chamber 15 and the second compression chamber 13, and more specifically fluid flow from the damping chamber 15 to the second compression chamber 13. As the suspension ceases to compress and begins to rebound, the second piston 21 may move upwardly, thereby increasing the effective size of the second compression chamber 13, and thereby reducing the pressure of the compressible fluid within the second compression chamber. When the pressure of the gas in the rebound chamber 15 and the force of the first check spring 41 exceed the pressure of the gas in the second compression chamber 13, the first check spring 41 may expand, thereby causing the valve peg 40 to seat again against the o-ring 25, thereby sealing off the flow passage 26 through the center of the second piston 21. As the second piston 21 moves upward, it may also reduce the effective size of the rebound chamber 15, and thereby compress the gas in the rebound chamber 15. Gas in the rebound chamber 15 may only return to the second compression chamber 13 through the restrictive rebound hole 27 in the second piston 21, then past the ball 22 as the second check spring 23 contracts.

As may be best seen in FIGS. 6 and 9, near full extension, the first side 922 of the second piston 21 adjacent the rebound chamber 15 may contact the rubber seal 35 carried by the guide 28 supported on the guide spring 36. The rubber seal 35 may block the rebound valve 27 in the second piston 21, preventing further fluid communication between the rebound chamber 15 and the second compression chamber 13. Consequently, rising pressure in the rebound chamber 15 may arrest extension without harsh "topping out" of the suspension 1.

Figure 11:
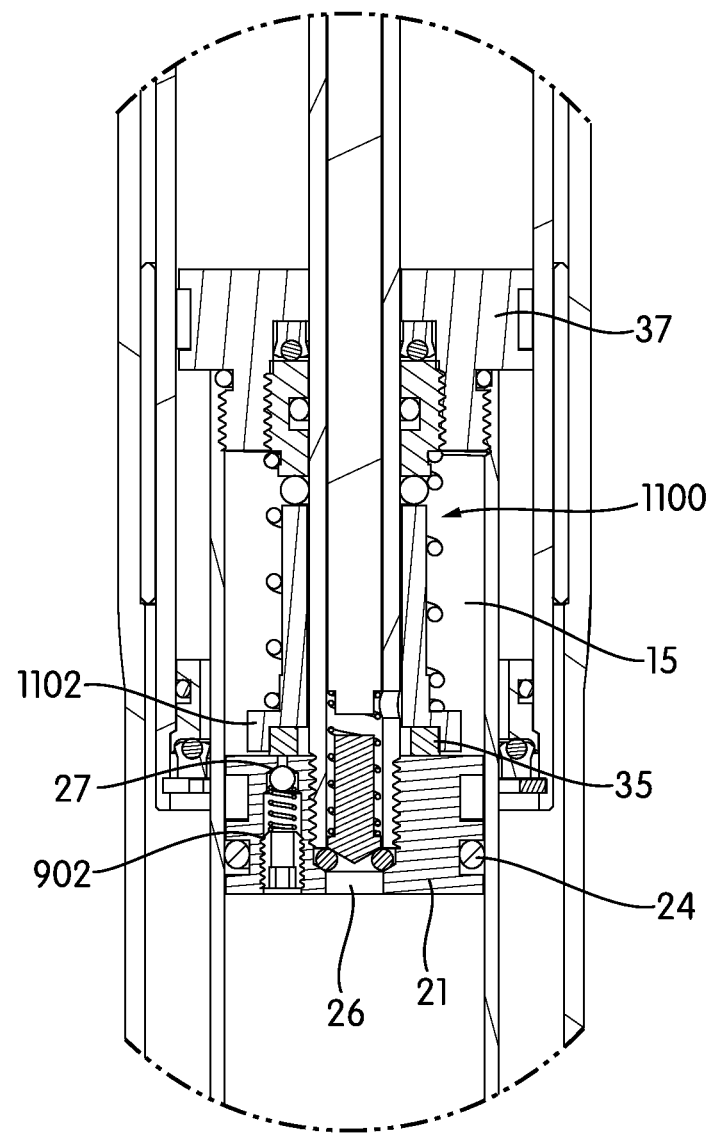
FIG. 11 is an enlarged view of the area enclosed by the circle identified as 11-11 in FIG. 10.
Figure 12:
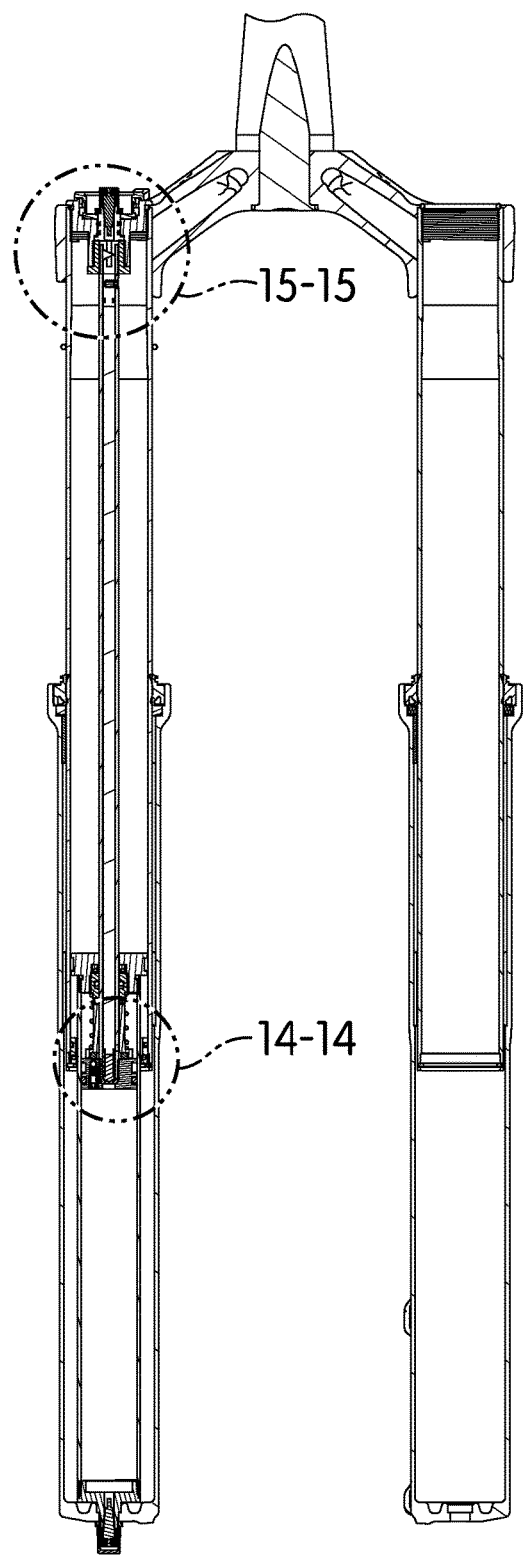
FIG. 12 is a simplified sectional view of the shock absorber according to FIG. 1, which shows the adjuster in an alternate position.
Figure 13:
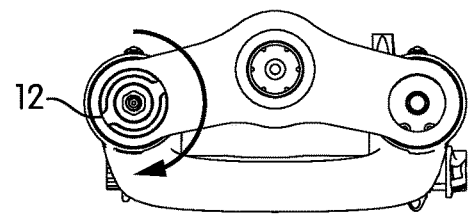
FIG. 13 is a top view of the shock absorber according to FIG. 1.

The positioning of the rubber seal 35 as a stop to substantially prevent fluid from entering the second valve 902 may be seen in FIG. 11. When the first end and the second end are at their most extended position, the first piston 37 and the second piston 21 may be positioned near one another and may be separated by the stop 1100. As described above, the stop 1100 may create a physical barrier that may minimize or prevent fluid from flowing from the damping chamber 15 into the second biased valve 27. As may be seen in FIG. 11, a shoulder 1102 on the stop 1100 may include the rubber seal 35 that comes into contact with the opening 27 to the second biased valve 902. The use of a stop 1100 made of a resilient material, in addition to including a spring 36 may allow the stop 1100 to absorb and dissipate any residual energy from the compression stroke.

Because of the restricted flow of gas through the rebound valve 902 through the second piston 21, the rebound of the suspension 1 may be desirably damped. The relative pressure in the first compression chamber 10, the second compression chamber 13, and the damping chamber 15 may determine the density of the damping medium, such as the compressible fluid or gas flowing through the rebound valve 27 in the second piston 21. The relative pressure may also determine the time required to equalize pressures in the second compression chamber 13 and the damper chamber 15 under a given level of extensive force exerted by the first compression chamber 10.

The speed at which the suspension may extend during rebound therefore is determined by the difference between the starting pressure in the first compression chamber 10 and the starting pressure in the damper chambers, i.e., the second compression chamber 13 and the rebound chamber 15. Any significant level of rebound damping requires a starting pressure in the damper chambers somewhat higher than that in the first compression chamber.

By varying the starting pressures set through the first and second Schrader valves 8 and 33, the user may achieve both the desired level of overall support of the suspension and the desired rebound rate.

Because the rebound rate may be adjusted through pressure alone, there is no need for adjustment of a valve orifice through an externally accessible mechanical linkage. The interior of the damper shaft, which is the usual location for such parts, is available instead for components for adjusting the compression damping and/or spring rate of the suspension as will be described below.

Applicant has chosen to simplify the naming of the chambers within this disclosure. Some of the chambers disclosed herein perform multiple functions, which may be oversimplified in the names selected. The chamber 10 is referred to herein as a compression chamber. When the fluid in the chamber 10 is compressed, it may create progressive resistance, because the suspension system 1 is designed so that the fluid in the compression chamber 10 remains within the compression chamber 10 to create a damping function. The chamber 13 is referred to herein as a second compression chamber 13. A person having ordinary skill in the art will understand that if the fluid is prevented from flowing along the path 920, the second compression chamber 13 will perform substantially as a gas spring. However, because the compressible fluid can exit the second compression chamber 13 along the path 920 and into the damping chamber 15, the second compression chamber 13 also acts as a damping chamber. The chamber 15 is referred to as a first damping chamber. The first damping chamber 15 may act as a damping chamber when the compressible fluid can flow along the flow path 910. The first damping chamber 15 may also be considered a rebound chamber, because it tends to resist rebound. When the compressible fluid is prevented from flowing along the flow path 910, the first damping chamber may be a negative spring chamber to resist rebound. A person having ordinary skill in the art is able to easily understand these changing functions based on the position of the remaining features of the suspension 1 without undue confusion or experimentation.

In one embodiment, a shock absorber 1 may include a first tube 2, a second tube 3 and a third tube 4. The first tube 2 may at least partially define a first compression chamber 10. The third tube 4 may be within the second tube 3 and may at least partially define a second compression chamber 13 and a damping chamber 15. The damping chamber 15 may be axially between the first compression chamber 10 and the second compression chamber 13 as defined by the axis 200.

In another embodiment, a shock absorber 1 may include a first tube 2, a second tube 3, a third tube 4, a first seal 6, a first shaft 20, a first piston 37, and a second seal 5. The first tube 2 may include a first tube free end 400. The third tube 4 may include a third tube free end 604. The first seal 6 may be attached to the first tube free end 300 and may be sealingly engaged with the third tube 4. The first piston 37 may be attached to the third tube free end 300. The first piston 37 may substantially surround the first shaft 20 and may have an inner diameter 600 and an outer diameter 602. The second seal 5 may be attached to the inner diameter 600 of the first piston 37. The first seal 6 and the second seal 5 may have the same shape. The first seal 6 may be oriented in a first direction 302 and the second seal 5 may be oriented in a second direction 402.

In another embodiment, a shock absorber 1 may include a first end assembly 202 and a second end assembly 204. The first end assembly 202 may include a first dynamic seal 6. The first dynamic seal 6 may have a portion in sealing engagement with the second end assembly 204. The second end assembly 204 may include a second dynamic seal 5. The second dynamic seal 5 may have a portion in sealing engagement with the first end assembly 202. The first dynamic seal 6 and the second dynamic seal 5 may each be oriented to minimize friction between the seal and the end with which it is in sealing engagement during a compression stroke.

In another embodiment, the shock absorber 1 may include a first end 202, a second end 204, a first piston 37, a second piston 21, a first biased valve 900, and a second biased valve 902. The first end 202 may at least partially define a first compression chamber 10 filled with a compressible fluid. The second end 204 may at least partially define a second compression chamber 13 and a damping chamber 15. Each of the second compression chamber 13 and the first damping chamber 15 may be filled with a compressible fluid. The first piston 37 may be attached in substantially fixed relationship to the second end 204. The first piston 37 may be configured to reciprocate within the first end. The second piston 21 may be attached in substantially fixed relationship to the first end 202. The second piston 21 may be configured to reciprocate within the second end 204. Movement of the second piston 21 may at least partially define the relative sizes of the second compression chamber 13 and the first damping chamber 15. The first biased valve 900 may be configured to permit fluid flow between the second compression chamber 13 and the first damping chamber 15 when the force of the fluid within the second compression chamber 13 exceeds the force of the fluid within the first damping chamber 15 and the force of the bias 41 on the first biased valve 900. The second biased valve 902 may be configured to permit fluid flow between the second compression chamber 13 and the first damping chamber 15 when the force of the fluid within the first damping chamber 15 exceeds the force of the fluid within the second compression chamber 13 and the force of the bias 23 on the second biased valve 902.

In another embodiment, the shock absorber 1 may include a first tube 2, a first valve 8, a second tube 3, a second valve 33, a third valve 900, and an adjuster 500. The first tube 2 may at least partially define a first compression chamber 10 filled with compressible fluid. The first valve 8 may permit the compressible fluid to be removed from the first compression chamber 10 and to permit additional compressible fluid to be added to the first compression chamber 10. The second tube 3 may at least partially define a second compression chamber 13 and a first damping chamber 15. The second compression chamber 13 and the first damping chamber 15 may each be filled with the compressible fluid. The second valve 33 may permit the compressible fluid to be removed from the second compression chamber 13 and to permit additional compressible fluid to be added to the second compression chamber 13. A third valve 900 may be between the second compression chamber 13 and a first damping chamber 15. The third valve 900 may permit compressible fluid to flow between the second compression chamber 13 and the first damping chamber 15. The adjuster 500 may be capable of adjusting a threshold at which the third valve 900 opens to allow compressible fluid to flow between the second compression chamber 13 and the first damping chamber 15.

In another embodiment, a shock absorber 1 may include a first chamber 10, a first valve 8, a second chamber 13, a second valve 33, a third chamber 15, a third biased valve 900, a first barrier 37 and a second barrier 21. The first valve 8 may allow the introduction of a first compressible fluid to and removal of the first compressible fluid from the first chamber 10. The second valve 33 may allow the introduction of a second compressible fluid to and removal of the second compressible fluid from the second chamber 13. The third biased valve 900 may allow the introduction of the second compressible fluid to the third chamber 15 from the second chamber 13. The adjuster 500 may be configured to adjust the bias 41 of the third biased valve 900. The first barrier 37 may be between the first chamber 10 and the third chamber 15. The first barrier 37 may be capable of axial movement. The second barrier 21 may be between the second chamber 13 and the third chamber 15. The third biased valve 900 may be positioned adjacent the second barrier 21. The pressure of the first compressible fluid, the pressure of the second compressible fluid, and the bias 41 of the third biased valve 900 may define the relative sizes of the first chamber 10, the second chamber 13 and the third chamber 15.

In another embodiment, a shock absorber 1 may include a first end 202, a second end 204, a first piston 37, a second piston 21, a first valve 900, a second valve 902, and a stop 1100. The first end 202 may at least partially define a first compression chamber 10 filled with a compressible fluid. The second end 204 may at least partially define a second compression chamber 13 and a first damping chamber 15. Each of the second compression chamber 13 and the first damping chamber 15 may be filled with a compressible fluid. The first piston 37 may be attached in a substantially fixed relationship to the second end 204. The first piston 37 may be configured to reciprocate within the first end 202. The second piston 21 may be attached in substantially fixed relationship to the first end 202. The second piston 21 may be configured to reciprocate within the second end 204. Movement of the second piston 21 may at least partially define the relative sizes of the second compression chamber 13 and the first damping chamber 15. The first valve 900 may be configured to permit fluid flow between the second compression chamber 13 and the first damping chamber 15. The second valve 902 may be configured to permit fluid flow between the second compression chamber 13 and the first damping chamber 15. The stop 1100 may be configured to prevent fluid from entering the second valve 902.

In the disclosed embodiments, structures and apertures of various sizes and shapes were illustrated. The precise configurations of these items are shown in an illustrative fashion only. A designer can easily change the shape, size, material, number, or other features of these items to achieve a particular characteristic that the designer may deem particularly desirable or helpful. These modifications are well within the knowledge of a designer having ordinary skill in the art. In addition, various embodiments may have disclosed a particular modification to a primary embodiment. A designer will be able to easily understand how to incorporate multiple changes to the design as disclosed and will also understand which changes cannot be incorporated in the same structure. A designer can do these substitutions without undue experimentation.

This detailed description in connection with the drawings is intended principally as a description of the presently preferred embodiments of the invention and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. A shock absorber comprising:
   a first end including at least a first tube at least partially defining a first compression chamber filled with a compressible fluid;
   a first Schrader valve extending between an exterior of the first tube and an interior of the first tube and permitting the compressible fluid to be removed from the first compression chamber and permitting additional compressible fluid to be added to the first compression chamber;
   a second end including at least a second tube at least partially defining a second compression chamber and a first damping chamber, each filled with the compressible fluid;
   a second Schrader valve extending between an exterior of the second tube and an interior of the second tube and permitting the compressible fluid to be removed from the second compression chamber and permitting additional compressible fluid to be added to the second compression chamber;
   a third valve between the second compression chamber and the first damping chamber, permitting compressible fluid to flow between the second compression chamber and the first damping chamber; and
   an adjuster capable of adjusting a threshold at which the third valve opens to allow compressible fluid to flow between the second compression chamber and the first damping chamber.

2. The shock absorber according to claim 1, further comprising a fourth valve between the second compression chamber and the first damping chamber, permitting compressible fluid to flow between the second compression chamber and the first damping chamber.

3. The shock absorber according to claim 1, further comprising a first dynamic seal attached to the first tube and in sealing engagement with the second tube and a second dynamic seal attached to the second end and in sealing engagement with the first end.

4. The shock absorber according to claim 3, wherein the first dynamic seal includes a lip that extends in a first direction.

5. The shock absorber according to claim 4, wherein the second dynamic seal includes a lip that extends in a second direction opposite the first direction.

6. The shock absorber according to claim 1, wherein the compressible fluid in the first tube is separated from the compressible fluid in the second tube.

7. The shock absorber according to claim 1, further comprising a bias to bias the third valve.

8. The shock absorber according to claim 7, wherein the bias of the third valve is adjustable.

9. The shock absorber according to claim 8, further comprising the adjuster positioned adjacent the first end for adjusting the bias.

10. The shock absorber according to claim 1, wherein a fluid pressure in the first compression chamber and a fluid pressure in the second compression chamber are independently adjusted by the introduction to and removal of the compressible fluid in the first end and the second end using the first Schrader valve and the second Schrader valve, respectively, so that the difference between a force of the fluid pressure in the first compression chamber and a force of the fluid pressure in the second compression chamber governs a rate of rebound of the shock absorber.

11. The shock absorber according to claim 9, wherein the adjuster is configured to affect only relative fluid pressures in the second compression chamber and the first damping chamber without affecting a pressure in the first compression chamber.

12. The shock absorber according to claim 2, further comprising a stop capable of substantially preventing fluid from entering the fourth valve.

* * * * *